Patented Sept. 21, 1948

2,449,866

UNITED STATES PATENT OFFICE 2,449,866

STREPTOMYCIN AND PROCESS OF PREPARATION

Selman A. Waksman, New Brunswick, and Albert Schatz, Passaic, N. J., assignors to Rutgers Research and Endowment Foundation, a nonprofit corporation of New Jersey No Drawing. Application February 9, 1945, Serial No. 577,136

13 Claims. (Cl. 260—236.5)

This invention relates generally to antibiotic substances and more particularly to a new and useful antibiotic substance, streptomycin, and the process for preparing the same by cultivation under particular controlled conditions of strains of the microorganism *Actinomyces griseus*. This organism was first isolated from the soil and characterized by one of the present applicants, S. A. Waksman, and is described in his publication in Soil Science 8, 71 (1919).

With the exception of streptothricin, the discovery and characteristics of which were reported by Waksman and Woodruff in Proc. Soc. Biol. Med. 49, 207 (1942) and Jour. of Bact. 46, 299 (1943), most antibiotic substances known at the present time, including penicillin and other mold products as well as gramicidin and actinomycin, act largely upon gram-positive bacteria. Streptothricin is very active against a number of gram-positive and gram-negative bacteria but has very little activity against certain bacteria of both groups, particularly the gram-positive *Bacillus mycoides* and *Bacillus cereus* and the gram-negative *Pseudomonas fluorescens*, *Pseudomonas aeruginosa*, and *Serratia marcescens*.

It is now discovered, according to the present invention, that upon cultivation of strains of the microorganism *Actinomyces griseus* in a suitable nutrient medium a new substance can be isolated from the resulting culture broth, which substance is thermostable; has the properties of a base; is soluble in water, acid alcohol and dilute acids but is insoluble in ether and chloroform; has a low toxicity to animals; and is strongly active bacteriostatically against many gram-positive and gram-negative bacteria. This substance has been designated as streptomycin. It is in many respects similar to streptothricin but differs from streptothricin as will be apparent from the comparative bacteriostatic spectra in Table I below. In this table the units of activity for streptothricin are based upon purified preparations of streptothricin while the units for streptomycin are based upon the crude and hence less concentrated substance. (A unit of activity is that amount of material which will inhibit the growth of a standard strain of *Esherichia coli* in 1 ml. of a suitable culture medium.) Comparative tests of the two substances, both purified to approximately the same degree, against *E. coli* show that they have substantially the same activity against this organism. For a better comparison of the bacteriostatic spectra of streptomycin and streptothricin of the same purity, the units of activity for streptomycin in Table I should therefore be multiplied by 4 in each instance.

TABLE I

Comparative bacteriostatic spectra (based on ash free dry material)

| Organism | Gram stain | Units of activity per gram ash-free dry material | |
|---|---|---|---|
| | | Streptomycin ×1000 | Streptothricin ×1000 |
| B. subtilis 0 | + | 125 | 500 |
| B. mycoides 0 | + | 250 | <3 |
| B. mycoides 317-911 | + | 20 | <3 |
| B. cereus | + | 30 | <3 |
| B. mesentericus | + | 15 | |
| B. megatherium | + | 100 | 150 |
| S. aureus | + | 15 | 200 |
| S. lutea | + | 100 | 150 |
| M. phlei | + | 100 | 50 |
| M. tuberculosis | + | 30 | |
| Phytomonas pruni | − | 100 | 400 |
| Listerella monocytogenes | − | 10 | |
| Shigella gallinarum | − | | 150 |
| E. coli | − | 25 | 100 |
| S. marcescens | − | 25 | 5 |
| A. aerogenes | − | 10 | 50 |
| P. vulgaris | − | 10 | 50 |
| S. aertrycke | − | 2.5 | |
| S. schottmülleri | − | | 50 |
| Ps. fluorescens | − | 2 | <3 |
| Ps. aeruginosa | − | 1 | <3 |
| Cl. butylicum | − | 3 | <3 |

It is apparent from a consideration of Table I that streptomycin is more active than streptothricin against certain gram-positive organisms such as *Bacillus mycoides* and *Bacillus cereus* and against certain gram-negative organisms such as *Pseudomonas fluorescens*, *Pseudomonas aeruginosa*, and *Serratia marcescens*.

A further inherent property of streptomycin is that in comparison with all of the activities listed for it in Table I, it is generally inactive against fungi. Representative fungi, against which streptomycin is relatively ineffective in comparison with the high activity of streptothricin, are listed in Annals of the New York Academy of Sciences, vol. 48, art. 2, page 137.

Regarded in certain of its broader aspects the novelty in the present invention comprises the antibiotic substance streptomycin and the process for preparing the same by cultivating strains of *Actinomyces griseus*, under either stationary or submerged aerobic (viz., submerged growth with agitation and aeration) conditions, in a nutrient medium containing a growth-promoting factor of the type present in meat extract and corn steep liquor, separating the organism growth from the culture broth, treating the culture broth with activated charcoal to adsorb the active product, eluting the adsorbate with low normality alcoholic mineral acid and recovering streptomycin from the eluate.

For the preparation of streptomycin a culture medium is used comprising an aqueous solution containing approximately 1.0% of carbohydrate such as glucose; 0.5% of complex nitrogenous material such as peptone or tryptone; 0.5% of inorganic salt such as sodium chloride; and a small amount of a complex organic substance containing a specific growth-promoting factor required for satisfactory elaboration of the active product. This growth-promoting factor is present in varying degrees in such complex organic materials as meat extract, corn steep liquor, and the like.

This medium is distributed in appropriate vessels of a depth of 1-2 inches for surface cultivation. For submerged aerobic cultivation, it is placed in deep tanks having suitable means for aeration and agitation of the medium. The medium thus distributed is sterilized at 10 lbs. steam pressure for 35-60 minutes and then cooled.

For inoculation of the culture medium a heavy water-suspension of spores of a strain of *Actinomyces griseus* is prepared by scraping from agar slants or by first growing the organism under submerged aerobic conditions to obtain a heavy mass of growth. Incubation takes place at a temperature of about 22-28° C. Elaboration of the streptomycin is usually complete in 6-12 days in the case of stationary cultures and in 2-4 days when cultivation is under submerged aerobic conditions.

The course of production of streptomycin under submerged and stationary conditions is illustrated in Table II.

TABLE II

*Course of production of streptomycin by A. griseus*

| Submerged cultures | | | Stationary cultures | | |
|---|---|---|---|---|---|
| Days | Dilution units | Diffusion units | Days | Dilution units | Diffusion units |
| 2 | 40 | 10 | 3 | 5 | 6 |
| 3 | 50 | 70 | 5 | 20 | 12 |
| 4 | 40 | 60 | 7 | 20 | 53 |
| 7 | 125 | 70 | 9 | 75 | ------ |
| | | | 12 | 100 | 55 |

The culture broth obtained by either submerged aerobic or stationary cultivation of *Actinomyces griseus* is filtered or centrifuged to remove the growth of the organism. Activated charcoal is then added to the filtered broth and the mixture is stirred for about 5 minutes and then filtered. Alternately, the mixture can be stored for about 8-12 hours at 0-10° C., with stirring at about two-hour intervals and then filtered. The colorless or slightly yellowish filtrate obtained is discarded. The charcoal residue with the adsorbed streptomycin is washed several times with distilled water and finally with 95% ethanol.

The washed material is then suspended in 95% ethanol made approximately 0.15 normal with mineral acid, such as hydrochloric, and the suspension is stirred for several hours and then allowed to stand in the cold for another 6-8 hours with occasional stirring. The suspension is then filtered, the charcoal residue discarded, and the brown to yellow clear filtrate thus obtained is added, with stirring, to approximately an equivalent amount of ether. A brown-colored aqueous layer separates and is drawn off. The alcohol ether solution is washed with additional small amounts of water and the brown aqueous washings are added to the aqueous layer previously drawn off. The aqueous solutions are then neutralized to pH 6-7 and any precipitate formed is filtered off and discarded. A faintly colored aqueous solution containing streptomycin is thus obtained.

When stationary cultivation is employed, the pellicle (or growth of organism) once formed can be utilized again several times. The culture broth after complete elaboration of the active substance, is carefully drained from the pellicle and replaced by an equal amount of fresh culture medium. The containers are again placed in incubation at 22-28° C. and production of streptomycin sets in immediately, reaching a maximum in 3 to 5 days. The broth obtained by re-using the pellicle in this manner is treated as previously described to give a substantially colorless aqueous solution of streptomycin.

The following examples illustrate methods of carrying out the present invention, but it is to be understood that these examples are given by way of illustration and not of limitation.

EXAMPLE I

A medium is prepared having the following composition:

| | Per cent |
|---|---|
| Glucose | 1.0 |
| Peptone | 0.5 |
| Meat extract | 0.3 |
| NaCl | 0.5 |

Tap water.

This medium is distributed in appropriate vessels to a depth of 1-2 inches, sterilized at 10 lbs. steam pressure for 45-50 minutes, and then cooled.

The medium in each vessel is then inoculated with a heavy aqueous suspension of spores of a strain of *Actinomyces griseus*, and the inoculated media are maintained at an incubation temperature of 22-28° C. for 10 days. The growth is then filtered off and the filtrates are combined for further treatment.

To a batch of approximately 10 liters of filtered broth is added 150 gms. of activated charcoal. The mixture is stirred continuously for about five minutes and is then filtered. The slightly yellowish (almost colorless) filtrate is discarded and the charcoal residue is washed several times with distilled water and finally with 95% ethanol. The washed material is then suspended in 1.5 liters of 95% ethanol, made 0.15 normal with hydrochloric acid. The suspension is stirred for about an hour and allowed to stand in the cold for about 10 hours more with occasional stirring. The suspension is then filtered, the charcoal residue discarded, and the yellowish clear filtrate thus obtained is poured into 10 liters of ether, with stirring. A brown-colored aqueous layer separates and is drawn off. The alcohol-ether solution is washed with 100 cc. of water and the brown aqueous layer is drawn off and added to the first aqueous layer. The aqueous solution is neutralized to pH 6–7 with dilute sodium hydroxide and any precipitate that forms is filtered off and discarded. A faintly colored aqueous solution containing streptomycin is thus obtained.

EXAMPLE II

A medium is prepared having the following composition:

| | Per cent |
|---|---|
| Glucose | 1.0 |
| Peptone | 0.5 |
| Sodium chloride | 0.5 |
| Corn steep liquor | 1.2 |
| Tap water. | |

This medium is distributed in appropriate deep vessels having suitable means for agitation and aeration of the medium, sterilized at 10 lbs. steam pressure for 45–50 minutes and then cooled.

The medium in each vessel is then inoculated with a heavy suspension of spores of a strain of *Actinomyces griseus*, and the inoculated media are maintained at an incubation temperature of 22–28° C. for 3 days, with constant agitation and aeration. The growth is then removed by centrifuging and the culture broth is combined and further treated as described in Example I to isolate a substantially colorless, clear aqueous solution containing streptomycin.

EXAMPLE III

The process of Example I is repeated with the exception that at the end of the incubation period instead of removing the broth by filtering it is carefully drained from the pellicle. An amount of fresh medium equivalent to the amount of broth drained from the pellicle is added to each vessel and the fresh media are again placed in incubation at 22–28° C. After 5 days in incubation the broth is again carefully drained from the pellicle and replaced by fresh medium. The broth obtained after each period of incubation is treated as in Example I to obtain a clear, substantially colorless, aqueous solution of streptomycin.

In the foregoing examples it is to be understood that the compositions of the culture media are merely illustrative and can be varied as, for example, by employing tryptone in place of peptone, and by employing meat extract and corn steep liquor alternatively in the several examples.

Modifications may be made in carrying out the present invention without departing from the spirit and scope thereof, and the invention is to be limited only by the appended claims.

What is claimed is:

1. A process for the production of streptomycin that comprises growing a culture of a streptomycin-producing strain of *Actinomyces griseus* in a medium containing material of the group consisting of meat extract and corn steep liquor, at an incubation temperature of 22–28° C. for a time of the order of 6–12 days for stationary cultivation and 2–4 days for submerged aerobic cultivation, to form streptomycin in the culture broth, separating the culture broth from the organism growth, adsorbing streptomycin from the broth, and recovering the adsorbed streptomycin.

2. A process for the production of streptomycin that comprises growing a culture of a streptomycin-producing strain of *Actinomyces griseus* in a medium containing meat extract, at an incubation temperature of 22–28° C. for a time of the order of 6–12 days for stationary cultivation and 2–4 days for submerged aerobic cultivation, to form streptomycin in the culture broth, separating the culture broth from the organism growth, adsorbing streptomycin from the broth, and recovering the adsorbed streptomycin.

3. A process for the production of streptomycin that comprises growing a culture of a streptomycin-producing strain of *Actinomyces griseus* in a medium containing corn steep liquor, at an incubation temperature of 22–28° C. for a time of the order of 6–12 days for stationary cultivation and 2–4 days for submerged aerobic cultivation, to form streptomycin in the culture broth, separating the culture broth from the organism growth, adsorbing streptomycin from the broth, and recovering the adsorbed streptomycin.

4. A process for the production of streptomycin that comprises growing a culture of a streptomycin-producing strain of *Actinomyces griseus* in a medium containing material of the group consisting of meat extract and corn steep liquor, at a suitable incubation temperature and for a suitable period of cultivation, to form streptomycin in the culture broth, separating the culture broth from the organism growth, treating the broth with activated carbon to adsorb streptomycin therefrom, and separating streptomycin from the carbon by eluting with acid-alcohol in which streptomycin is soluble.

5. A process for the production of streptomycin that comprises growing a culture of a streptomycin-producing strain of *Actinomyces griseus* in a medium containing material of the group consisting of meat extract and corn steep liquor, to form the latter in the culture broth, separating the culture broth from the organism growth, adsorbing streptomycin from the broth and recovering the adsorbed streptomycin by elution.

6. In a process for producing streptomycin by growing a culture of a streptomycin-producing organism under conditions favorable to the formation of streptomycin, the steps which comprise separating streptomycin from culture broth containing it, by treating the broth with active carbon, and recovering streptomycin from the carbon by eluting with acid-alcohol in which streptomycin is soluble, said acid-alcohol being of low acid normality.

7. Procedure for recovering streptomycin from a culture broth in which it has been produced, comprising treating the streptomycin-containing broth with activated carbon to adsorb streptomycin therefrom, and separating streptomycin from the carbon by eluting with acid-alcohol in which streptomycin is soluble.

8. A process for the production of streptomycin that comprises growing a culture of a streptomycin-producing strain of *Actinomyces griseus* in a medium containing material of the group consisting of meat extract and corn steep liquor, at a suitable incubation temperature and for a suitable period of cultivation, to form streptomycin in the culture broth, separating the culture broth from the organism growth, treating the broth with activated carbon to adsorb streptomycin therefrom, and recovering streptomycin from the carbon.

9. A process for the production of streptomycin that comprises growing a culture of a streptomycin-producing strain of *Actinomyces griseus* in a medium containing meat extract, at a suitable incubation temperature and for a suitable period of cultivation, to form streptomycin in the culture broth, separating the culture broth from the organism growth, and recovering streptomycin from the broth.

10. A process for the production of streptomycin that comprises growing a culture of a streptomycin-producing strain of *Actinomyces griseus* in a medium containing corn steep liquor, at a suitable incubation temperature and for a suitable period of cultivation, to form streptomycin in the culture broth, separating the culture broth from the organism growth, and recovering streptomycin from the broth.

11. A process for the production of streptomycin that comprises growing a culture of a streptomycin-producing strain of *Actinomyces griseus* at a suitable incubation temperature and for a suitable period of cultivation, to form streptomycin in the culture broth, separating the culture broth from the organism growth, adsorbing streptomycin from the broth, and recovering the adsorbed streptomycin.

12. A process for the production of streptomycin that comprises growing a culture of a streptomycin-producing strain of *Actinomyces griseus* at an incubation temperature of 22-28° C. for a time of the order of 6-12 days for stationary cultivation and 2-4 days for submerged aerobic cultivation, to form streptomycin in the culture broth, separating the culture broth from the organism growth, and recovering streptomycin from the broth.

13. Streptomycin.

SELMAN A. WAKSMAN.
ALBERT SCHATZ.

REFERENCES CITED

The following references are of record in the file of this patent:

UNITED STATES PATENTS

| Number | Name | Date |
|---|---|---|
| 2,326,986 | Waksman | Aug. 17, 1943 |
| 2,378,876 | Waksman | June 19, 1945 |
| 2,121,064 | Zender | June 21, 1938 |

OTHER REFERENCES

Waksman; Soil Science (1919); vol. 8; page 71.

Journal Bacteriology; October 1940; pages 581 to 600.

Schatz et al., Proc. Soc. Exp. Biol. & Med., January 1944, vol. 55, pages 66 to 69.

Thom, Oil and Drug Reporter, January 5, 1944, page 7.

Roper et al., Jr. Bact., December 1944, pages 647-648.

Welsch; Compte ren. de Soc. De Biologie, vol. 126, pages 247-249.